2,804,454

COMPLEX HEAVY METAL COMPOUNDS OF MONOAZO DYESTUFFS

Fabio Beffa, Basel, Switzerland, assignor to J. R. Geigy A.-G., Basel, Switzerland, a Swiss firm No Drawing. Application July 11, 1955, Serial No. 521,381

Claims priority, application Switzerland July 14, 1954

7 Claims. (Cl. 260—145)

The present invention concerns metallisable monoazo dyestuffs which contain no acid water solubilising groups and the complex heavy metal compounds thereof. It is concerned with processes for the production of these monoazo dyestuffs, processes for the conversion thereof into complex heavy metal compounds in substance or on substrata, dyeing processes using the new metal-free or metal containing monoazo dyestuffs as well as the material dyed with these dyestuffs.

It has been found that valuable metallisable monoazo dyestuffs are obtained if diazotised o-aminophenols having no acid water solubilising groups but which may otherwise be substituted as desired, are coupled with 1-carbamylamino-7-hydroxynaphthalene and the monoazo dyestuffs obtained are converted, if desired in substance, into their complex heavy metal compounds.

The new monoazo dyestuffs correspond to the general formula I

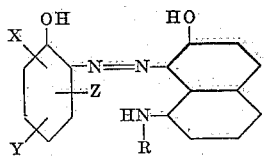

In this formula R represents a carbamyl group and X, Y and Z represent hydrogen or any non-ionogenic substituents desired which are usual in azo dyestuffs such as, for example, halogen, alkyl, nitro, acylamino, acyl, alkyl or aryl sulphone, sulphonic acid amide groups; also in particular sulphonic acid amide groups derived from secondary aliphatic, araliphatic or heterocyclic basic amines, cyano groups, carboxylic acid amide groups, in particular also carboxylic acid anilide groups.

The new dyestuffs are distinguished by sufficient water solubility for dyeing purposes both in the metal free and, in particular, also in the metallised condition if they contain none of the groups which up to now have been usual in unsulphonated metal containing wool dyestuffs which promote water solubility such as, for example a low molecular alkyl sulphone, the sulphonic acid amide or a sulphonic acid amide group derived from a low molecular primary alkylamine.

Examples of diazo components which can be used in the process according to the present invention are 4-, 5- or 6-nitro-2-amino phenol, 4- or 5-chloro-2-amino phenol, 4.5- or 4.6-dichloro-2-amino phenol, 3.4.6-trichloro-2-amino phenol, 4-methyl-, tert. butyl- or tert. amyl-2-amino phenol, 4-acetyl- or 4-benzoyl-2-amino phenol, 4-cyano-2-amino phenol, 4-n-butyl-, 4-phenyl- or 4-p-toluyl sulphonyl-2-amino phenol, 2-amino phenol-4-sulphonic acid dimethyl amide, -diethyl amide, -anilide, -N-methyl- or -N-ethyl anilide, -piperidide and -morpholide 4-methyl- or 4-chloro-5-nitro-2-amino phenol, 4-methyl-, 4-tert. butyl- or 4-tert. amyl-6-nitro-2-amino phenol, 4-acetylamino- or 4-chloro-6-nitro-2-amino phenol, 6-acetylamino- or 6-chloro-4-nitro-2-amino phenol, 6-acetyl-amino-4-acetyl- or -4-chloro- or -4-butyl sulphonyl-2-amino phenol, 4.6-dinitro-2-amino phenol.

1-Ureido-7-hydroxynaphthalene, which is easily obtained from 1-amino-7-hydroxynaphthalene and potassium cyanate, e. g. in aqueous or organic-aqueous solution can be named as an example of a 1-carbamyl-amino-7-hydroxynaphthalene coupling component which can be used according to the present invention.

The coupling is performed advantageously in aqueous-alkaline solution or suspension of the components, if desired in the presence of tertiary nitrogen bases such as triethylamine, triethanolamine or pyridine which accelerate the coupling.

Metal compounds of the iron group, of iron, cobalt, and nickel, of manganese, chromium and copper are suitable for the metallisation of the dyestuffs. The complex chromium and cobalt compounds are particularly suitable as textile dyestuffs while other metal complex compounds can be used for the dyeing of lacquers. Chroming is advantageously performed in aqueous solution or suspension by the treatment with alkali salts of chromosalicylic acid in the warm. To introduce the metals iron, cobalt, nickel and copper the monoazo dyestuffs according to the present invention are heated, advantageously in aqueous or organic solution, with the aqueous solutions of salts of these metals, if necessary in the presence of agents which neutralise the mineral acid. If desired metallising can also be done in the melt of low fatty acid amides such as, e. g. N.N-dimethyl formamide or acetamide, with heavy metal salts. The chroming and cobalting is performed advantageously with such amounts of agents giving off metal and under such conditions that metal compounds of the type $(F_1—M_1—F_2)M_2$ result wherein $F_1$ and $F_2$ represent two dyestuff molecules co-ordinated at the heavy metal atom $M_1$, and $M_2$ represents an alkali cation. Often complex metal compounds of the type named are valuable in which only one F represents a monoazo dyestuff according to the invention while the other F can represent any desired O.O'-dihydroxyazo or O-hydroxy-O'-carboxyazo dyestuff which has no acid water solubilising groups which do not take part in the formation of the metal complex.

Of particular interest are combinations of the monoazo dyestuffs according to the present invention which produce blue to green metal complexes with metallisable monoazo dyestuffs having no sulphonic acid groups and which produce yellow to orange metal complexes such as, for example, with the coupling products of diazotised o-amino phenols or o-aminobenzene carboxylic acids with acyl acetic acid arylamides and 5-pyrazolones. New, valuable olive brown, olive to green shades are obtained and, with other combinations, brown to grey shades. It is advantageous to use the complex chromium and cobalt compounds for textile purposes in the form of the soluble alkali salts, e. g. in the form of the lithium, sodium, potassium or cesium salts. If necessary, they can also be mixed with salts having an alkaline reaction such as sodium carbonate or trisodium phosphate and with cation active wetting and dispersing agents which reduce the surface tension.

The chromium or cobalt containing monoazo dyestuffs according to the present invention can be dyed from a weakly alkaline to weakly acid dyebath on to natural and synthetic polypeptide fibres such as wool, silk, polyamide and polyurethane fibres and, on these fibres, they produce dyeings with good fastness properties. Dyestuffs according to the present invention which do not contain metal are suitable for the dyeing of wool according to the single bath chroming method in the presence of alkali chromates and ammonium sulphate and they also produce very valuable wool dyeings.

The following examples illustrate the invention without limiting it in any way. Where not otherwise stated, parts are given as parts by weight and the temperatures are in degrees centigrade. The relationship of parts by weight to parts by volume is as that of kilogrammes to litres.

*Example 1*

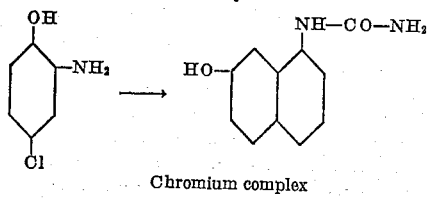

Chromium complex 14.4 parts of 4-chloro-2-aminophenol in 100 parts of water and 17 parts of concentrated hydrochloric acid are diazotised at 0–5° with 20 parts by volume of 5 N-sodium nitrite solution and, after neutralizing with sodium bicarbonate, poured at 0–3° into a solution of 21.2 parts of 1-ureido-7-hydroxynaphthalene, 10.5 parts by volume of 10 N-caustic soda lye, 15 parts of anhydrous sodium carbonate and 300 parts of water. On completion of the formation of the dyestuff, diluted sodium chloride solution is added, the precipitate is filtered off, the dyestuff is pasted in 400 parts of water, 350 parts by volume of a solution of sodium chromosalicylate (corresponding to 7.6 parts of chromic oxide) are added and the whole is boiled under reflux for some hours until the chromium complex has formed. The chromium containing dyestuff is precipitated by the addition of sodium chloride, filtered off and dried. It is a dark powder which dyes wool from a neutral or weakly acid bath in fast grey shades.

*Example 2*

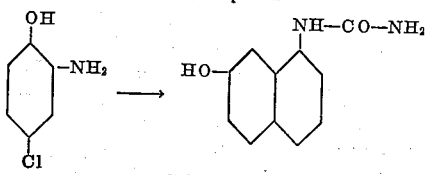

Cobalt complex 37.9 parts of the sodium salt of the dyestuff obtained according to Example 1 by diazotisation of 4-chloro-2-aminophenol and coupling with 1-ureido-7-hydroxynaphthalene, in 600 parts of water are heated for 1 hour at 80–85° with 60 parts of cobalt acetate solution (corresponding to 3.54 parts of cobalt). Anhydrous sodium carbonate is then added until there is a phenolphthalein alkaline reaction and the whole is stirred at 80–85° for some hours.

The cobalt containing dyestuff is isolated by the addition of sodium chloride. After drying, the dyestuff is a dark powder which dyes wool from a neutral or weakly acid bath in violet shades which have good fastness properties.

*Example 3*

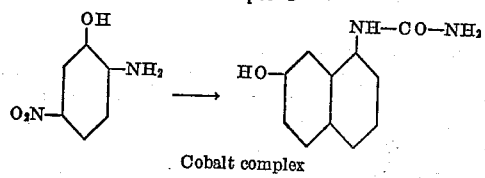

Cobalt complex 15.4 parts of 5-nitro-2-aminophenol are dissolved in 150 parts of hot water with 17 parts of concentrated hydrochloric acid. The solution is cooled to 5° and diazotised with a sodium nitrite solution (corresponding to 6.9 parts of sodium nitrite). The reaction is made neutral with sodium bicarbonate. The orange-red diazonium suspension is poured at 0–3° into a solution of 21.2 parts of 1-ureido-7-hydroxynaphthalene, 10.5 parts by volume of 10 N-caustic soda lye, 15 parts of anhydrous sodium carbonate in 300 parts of water. On completion of the formation of the dyestuff, the precipitated dyestuff is filtered off, washed with diluted sodium chloride solution and pasted in 600 parts of water. 60 parts of cobalt acetate solution (corresponding to 3.54 parts of cobalt) are added and the whole is heated for 1 hour at 80–85°. The reaction is made phenolphthalein alkaline by the addition of anhydrous sodium carbonate and the mixture is stirred for some hours at 80–85°. The cobalt containing dyestuff is filtered off, washed and dried. After drying, it is a dark powder which dyes wool from a neutral or weakly acid bath in blue shades which have good fastness properties.

*Example 4*

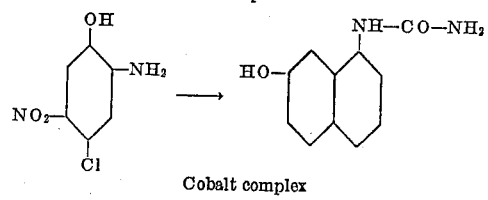

Cobalt complex 18.9 parts of 4-chloro-5-nitro-2-aminophenol in 150 parts of water are dissolved with 10.5 parts by volume of 10 N-caustic soda lye, a solution of 6.9 parts of sodium nitrite is added and, after cooling to 5°, the whole is stirred into a mixture of 30 parts of concentrated hydrochloric acid, 100 parts of water and 30 parts of ice. Sodium bicarbonate is then added until Congo red paper is no longer coloured blue and then the diazonium compound in poured into a solution of 21.2 parts of 1-ureido-7-hydroxynaphthalene, 10.5 parts by volume of 10 N-caustic soda lye and 15 parts of anhydrous sodium carbonate in 300 parts of water. On completion of the dyestuff formation, the precipitated dyestuff is filtered off, washed with diluted sodium chloride solution and pasted in 600 parts of water. 60 parts of cobalt acetate solution are added (corresponding to 3.54 parts of cobalt) and the whole is heated for 1 hour at 80–85°. The reaction is then made phenolphthalein alkaline by the addition of anhydrous sodium carbonate and stirring is recommenced for some hours at 80–85°. The cobalt containing dyestuff is filtered off and washed with salt solution. After drying, the dyestuff is a dark powder which dyes wool from a neutral or weakly acid bath in fast blue shades.

*Example 5*

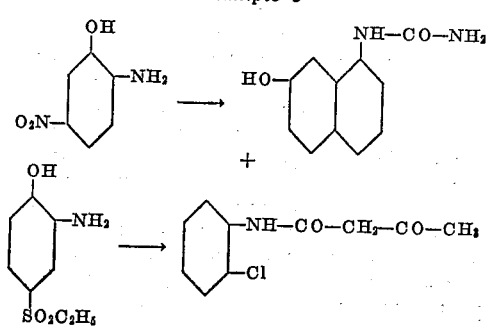

Cobalt complex 19.5 parts of the sodium salt of the dyestuff from diazotised 5-nitro-2-aminophenol and 1-ureido-7-hydroxynaphthaline and 22.3 parts of the sodium salt of the dyestuff from diazotised 2-aminophenol-4-ethyl sulphone and acetoacetic-o-chloranilide, both produced in the usual manner, are melted while stirring with 250 parts of acetamide. 15 parts of cobalt acetate (corresponding to 3.54 parts of cobalt) are added and the whole is kept for 30 minutes at 90–100°. 10% sodium chloride solution is then added to the dark green melt until the cobalt containing dyestuff has precipitated. The dyestuff is filtered off and dried. After drying, it is a dark powder which dyes wool from a neutral or weakly acid bath in green shades which have good fastness properties.

Example 6

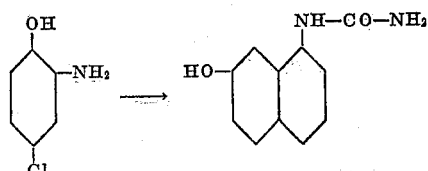

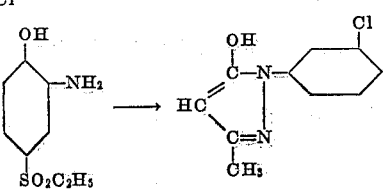

Cobalt complex 19 parts of the sodium salt of the dyestuff from diazotised 4-chloro-2-aminophenol and 1-ureido-7-hydroxynaphthalene and 22.1 parts of the sodium salt of the dyestuff from diazotised 2-aminophenol-4-ethyl sulphone and 1-(3'-chlorophenyl)-3-methyl-5-pyrazolone are melted together in 250 parts of acetamide. 15 parts of cobalt acetate (corresponding to 3.54 parts of cobalt) are added and the whole is kept at 90–100° until the cobalt complex has formed. Diluted sodium chloride solution is added to the dark brown melt. The cobalt containing dyestuff which precipitates, is filtered off and dried. After drying, it is a dark powder which dyes wool from a neutral or weakly acid bath in beautiful brown shades which have good fastness properties.

The further dyestuffs listed in the table below are obtained according to the methods fully described in the examples.

| No. | Diazo component | Coupling component | Metal | Shade |
|---|---|---|---|---|
| 1 | 5-nitro-4-methyl-2-aminophenol. | 1-ureido-7-hydroxynaphthalene. | Co | blue. |
| 2 | 6-nitro-4-methyl-2-aminophenol. | ----do---- | Co | Do. |
| 3 | 4-nitro-2-aminophenol. | ----do---- | Cr | olive. |
| 4 | 5-nitro-4-chloro-2-aminophenol. | ----do---- | Cr | blue-grey. |
| 5 | 5-nitro-4-methyl-2-aminophenol. | ----do---- | Cr | Do. |
| 6 | 5-nitro-2-aminophenol. | ----do---- | Cr | Do. |
| 7 | 4-nitro-2-aminophenol. | ----do---- | Co | grey. |
| 8 | 2-aminophenol-4-butylsulphone. | ----do---- | Co | violet. |
| 9 | 6-acetylamino-4-nitro-2-aminophenol. | ----do---- | Cr | olive green. |
| 10 | ----do---- | ----do---- | Co | green-grey. |
| 11 | 2-aminophenol-4-phenyl sulphone. | ----do---- | Co | violet. |
| 12 | 2-aminophenol-4-sulphanilide. | ----do---- | Co | Do. |
| 13 | 2-aminophenol-4-sulphdiethylamide. | ----do---- | Co | Do. |
| 14 | {5-nitro-4-chloro-2-aminophenol. 2-aminophenol-4-ethyl sulphone. | {1-ureido-7-hydroxynaphthalene. acetoacetic-m-chloranilide. | Co | green. |
| 15 | {5-nitro-4-methyl-2-aminophenol. 2-aminophenol-4-ethyl sulphone. | {1-ureido-7-hydroxynaphthalene. acetoacetic-o-chloranilide. | Co | Do. |
| 16 | {4-nitro-2-aminophenol. 2-aminophenol-4-ethyl sulphone. | {1-ureido-7-hydroxynaphthalene. 1-(3'-chlorophenyl)-3-methyl-5-pyrazolone. | Co | brown. |

Example 7

2 parts of the dystuff according to Example 3 are dissolved in 4000 parts of water. 100 parts of wool are entered at 50°, 5 parts of ammonium acetate are added and the bath is brought to the boil within 45 minutes and is kept at this temperature for 1½ hours while moving the goods well. The wool is then rinsed and dried. The wool which is dyed in blue shades is distinguished by good fastness properties.

What I claim is:

1. A metalliferous compound which contains one atom of a metal selected from the group consisting of cobalt and chromium in complex union with one molecule of an O.O'-dihydroxymonoazo dyestuff which is free from sulphonic acid and carboxylic acid groups and which corresponds to the formula:

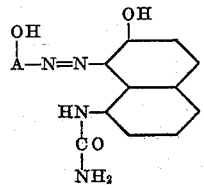

in which A represents a benzene radical bound to the azo group in ortho-position to the hydroxyl group and with one molecule of a dihydroxy-monoazo dyestuff which is free from sulphonic and carboxylic acid groups and is selected from the group consisting of benzene-azo-acetoacetic acid arylamide, benzeneazo-5-pyrazolone and benzene-azo-naphthol dyestuffs.

2. A metalliferous compound which contains one atom of a metal selected from the group consisting of cobalt and chromium in complex union with two molecules of a dyestuff which is free from sulphonic acid and carboxylic acid groups of the formula:

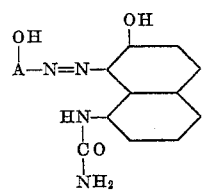

in which A represents a benzene radical bound to the azo group in ortho-position to the hydroxyl group.

3. The complex chromium compound which contains one atom of chromium bound in complex union to two molecules of a dyestuff of the formula:

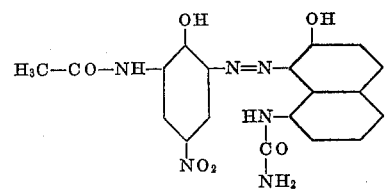

4. The complex cobalt compound which contains one atom of cobalt bound in complex union to two molecules of a dyestuff of the formula:

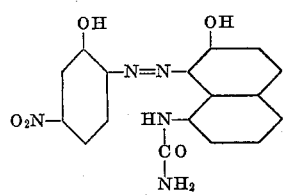

5. The complex chromium compound which contains one atom of chromium bound in complex union to two molecules of a dyestuff of the formula:

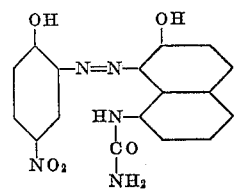

6. The complex chromium compound which contains one atom of chromium bound in complex union to two molecules of a dyestuff of the formula:

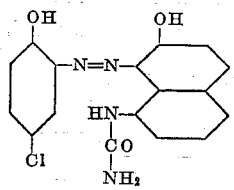

7. The complex cobalt compound which contains one atom of cobalt bound in complex union to one molecule of each of the two dyestuffs of the formulae:

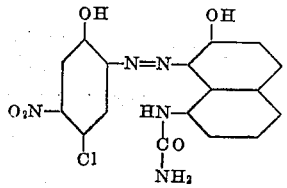

and

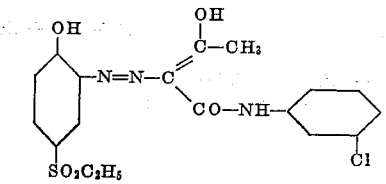

References Cited in the file of this patent

UNITED STATES PATENTS

| | | |
|---|---|---|
| 1,835,821 | Straub et al. | Dec. 8, 1931 |
| 2,276,174 | Fleischhaver et al. | Mar. 10, 1942 |
| 2,351,936 | Dohrn et al. | June 20, 1944 |
| 2,367,073 | Thurston | Jan. 9, 1945 |
| 2,551,056 | Schetty | May 1, 1951 |
| 2,610,175 | Widmer et al. | Sept. 9, 1952 |

FOREIGN PATENTS

| | | |
|---|---|---|
| 1,110,460 | France | Oct. 12, 1955 |